United States Patent [19]

Brink

[11] 4,384,897
[45] May 24, 1983

[54] METHOD OF TREATING BIOMASS MATERIAL

[75] Inventor: David L. Brink, Berkeley, Calif.

[73] Assignee: The Regents of the University of California, Berkeley, Calif.

[21] Appl. No.: 324,032

[22] Filed: Nov. 23, 1981

[51] Int. Cl.$^3$ .............................................. C13K 1/04
[52] U.S. Cl. ........................................... 127/37; 127/1
[58] Field of Search ...................................... 127/37, 1

[56] References Cited

U.S. PATENT DOCUMENTS

| | | | |
|---|---|---|---|
| 2,801,939 | 8/1957 | Hignett et al. | 127/37 |
| 3,212,933 | 10/1965 | Hess et al. | 127/37 |
| 4,025,356 | 5/1977 | Nyman et al. | 127/37 |
| 4,199,371 | 4/1980 | Regnault et al. | 127/37 |

Primary Examiner—William F. Smith
Attorney, Agent, or Firm—Edward B. Gregg

[57] ABSTRACT

Method of treating biomass material wherein it is subjected to two stage hydrolysis in which in first stage, the more easily hydrolyzed polysaccharides, such as hemicelluloses, are depolymerized and in second stage the more difficultly depolymerizable material, e.g., cellulose, is depolymerized. The biomass material is preferably subjected to a sensitization step between the first and second hydrolyzing stages by contact with molecular oxygen. The resulting hydrolysate and remaining solids are variously treated, including recycling of hydrolysate to first stage hydrolysis; countercurrent or co-current flow of recycled hydrolysate is carried out according to the nature of solids; acid is added at appropriate points, preferably nitric acid to provide nutrients for fermentation or to inhibit corrrosion of equipment; bases such as calcium carbonate or hydroxide are added to neutralize hydolysate for fermentation; wet oxidation and methanation are carried out to solubilize refractory solids (wet oxidation) and to produce methane (methanation); and ferric and/or aluminum ions are added to flocculate solids in the hydrolysate and such ions are recovered and resolubilized by wet oxidation and are routed to the hydrolysis stages to function as catalysts.

7 Claims, 6 Drawing Figures

Fig_1

Fig_2

Fig._3

Fig_4

Fig_5A

Fig_5B

METHOD OF TREATING BIOMASS MATERIAL

This invention relates to the treatment of polysaccharide material such as cellulose, hemicelluloses and lignocellulose by hydrolysis to produce monosaccharides such as pentoses and hexoses; to the production of ethanol from such monosaccharides; to the wet oxidation of solids such as lignin to produce soluble products of value such as organic acids; and to the methanation of residues from wet oxidation and fermentation-rectification.

In Brink and Schaleger, U.S. patent application Ser. No. 23,338, filed Mar. 23, 1979, entitled "Utilization of Cellulosic and Lignocellulosic Materials", there is described a process as follows: Biomass material is subjected to a first stage hydrolysis under relatively mild conditions, typically about 140° to 220° C. at a pH of about 2.0 to 3.0 to cause hydrolysis of the more readily hydrolyzable polysaccharides such as the hemicelluloses. This results in the production of pentoses and hexoses. This hydrolysis step is followed by a sensitization step in which the material is contacted with molecular oxygen, e.g., air, typically at a temperature of about 140° to 220° C. This is followed by a second stage hydrolysis under more severe conditions typically a temperature of about 160° to 240° C. The solids which are not solubilized by this treatment, e.g., lignin where the biomass feed material is lignocellulose, is then subjected to wet oxidation in which molecular oxygen, for example, air is passed through a slurry of the solids under conditions to cause oxidation and the production of heat which can be used in the process or for other purposes.

The process of Brink, U.S. Pat. No. 3,562,319 may be used in the wet oxidation step.

Conditions in the first stage hydrolysis, sensitization, second stage hydrolysis and wet oxidation, e.g., temperatures and pH, may be as described in the Brink and Schaleger patent application at page 4, line 6 to page 7, line 22 which is incorporated herein by reference. Flow rates are adjusted to optimize yields and concentrations. It is advantageous to maintain the hydrolytic and sensitization conditions to effect maximum yields and concentration of monosaccharides but in order to achieve high yields it may be necessary to sacrifice concentration and vice versa. An optimum balance should be maintained.

The products of this Stage I hydrolysis-sensitization-Stage II hydrolysis-wet oxidation process include sugar solutions and organic acids, aldehydes, etc. An aqueous solution of predominantly pentoses may be produced separately from an aqueous solution of predominantly glucose or a single stream of hydrolysate containing both pentoses and glucose may be produced. These monosaccharides are subjected to fermentation to produce ethanol and the beer resulting from fermentation may then be subjected to rectification to produce ethanol of commercial grade, for example, 95% ethanol.

Residues from the wet oxidation and rectification steps may be subjected to methanation by processes well known to the art involving the use of micro-organisms.

It is an object of the present invention to provide improvements upon the process of application Ser. No. 23,338. Among such improvements are more efficient washing of solids, the use of co-current washing or countercurrent washing of solids according to whether the solids are easily washed or can be washed only with difficulty, the use of ferric and/or aluminum ions as flocculating agents to separate suspended solids from hydrolysate and the recovery of these ions by wet oxidation to be recycled, used as catalysts in hydrolysis and again as flocculating agents.

The above and other objects will be apparent from the ensuing description and the appended claims.

Certain embodiments of the invention are illustrated by way of example in the accompanying drawings in which.

Figure 1:
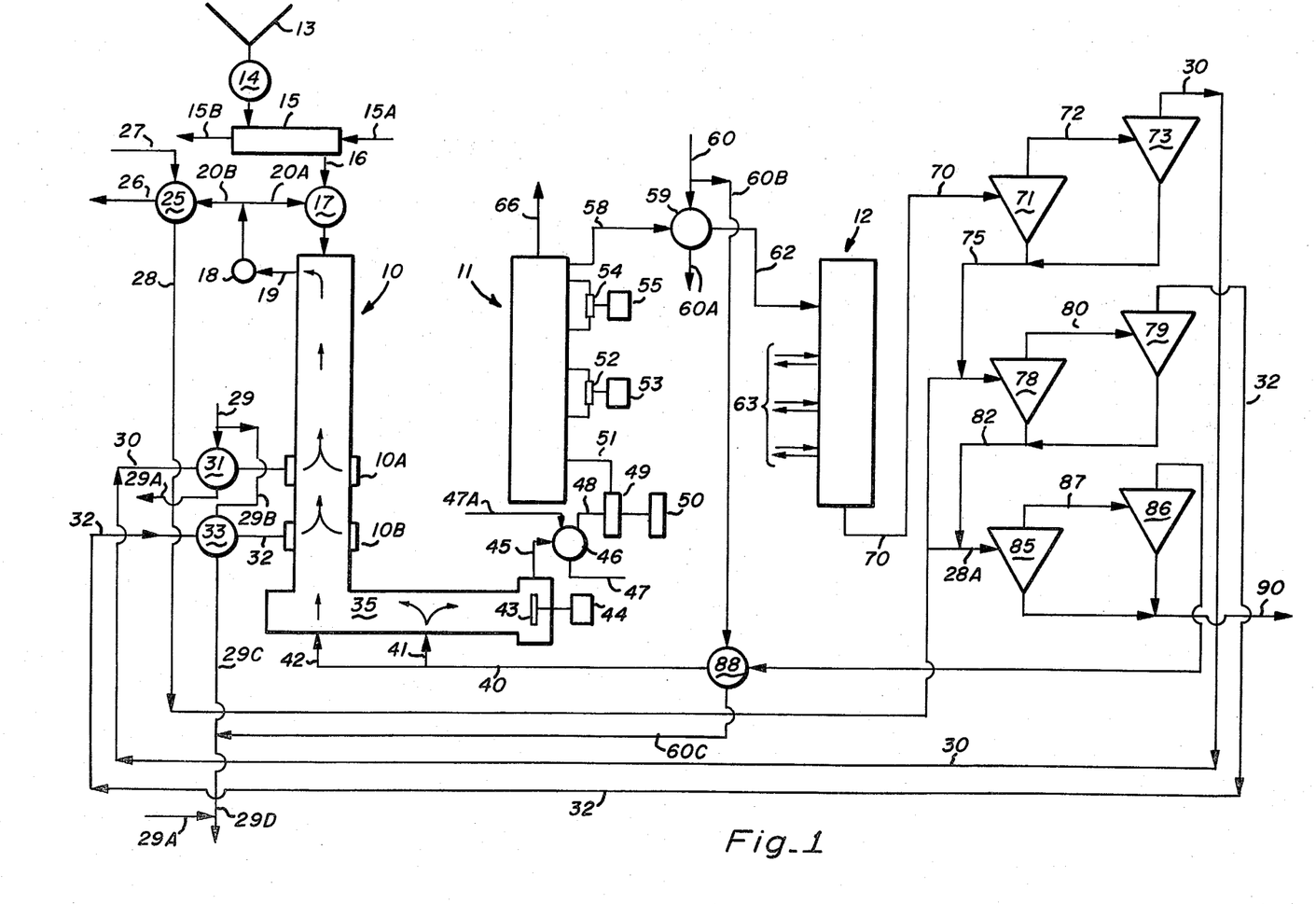
FIG. 1 is a flow diagram of one embodiment of the invention.

Referring now to FIG. 1, major pieces of equipment are a Stage I hydrolyzer 10, a sensitizer 11 and a Stage II hydrolyzer 12. Biomass material stored in hopper 13 is introduced continuously or intermittently according to need by a low pressure rotary valve 14 into a screw conveyor 15 which also functions as a pre-steaming unit by the introduction of steam through a conduit 15A and exits through a conduit 15B. The purpose of this pre-steaming is to remove volatile material and air.

The biomass material may be any sort of polysaccharide, cellulosic or lignocellosic material such as wood chips prepared from the trunks of trees for use in the manufacture of pulp for papermaking; forest waste such as stumps, roots, branches and foliage which is suitably comminuted, agricultural waste such as orchard and vineyard trimmings, the stalks and leaves of grasses such as rice, wheat and corn and of cotton plants; grain such as corn, rice and wheat, bagasse and all manner of polysaccharides.

The biomass material descends by gravity through a conduit 16 to a high pressure rotary valve 17 and is metered by this valve to the upper part of Stage I hydrolyzer 10. Stage I hydrolyzer 10 is supplied as described hereinafter with recycle streams which move upwardly while the biomass material moves downwardly. Liquid phase is pumped by pump 18 through line 19 to a T. Part of this stream is recycled through line 20a to rotary valve 17 and part is passed through line 20b to a heat exchanger 25 and leaves the system through line 26 for treatment as desired, for example, fermentation and further treatment as described in copending application Ser. No. 23,338 and in connection with FIG. 4 below. An aqueous recycle stream such as from the methanation unit of Ser. No. 23,338 enters through line 27 and passes through the heat exchanger 25 where it is heated by indirect heat exchange with the stream of hydrolysate. The heated recycle stream then passes through line 28 for processing as described hereinafter. A recycle stream passing through line 30 and consisting of an aqueous solution of glucose derived from second stage hydrolysis as described hereinafter passes through heat exchanger 31 into a mid-section of Stage I hydrolyzer 10, being heated by steam entering through line 29 and leaving through line 29A. As indicated, the heated stream of hydrolysate enters Stage I hydrolyzer 10 through a circular manifold 10A, such that it is uniformly distributed about the circumference of Stage I hydrolyzer and by flow control around the unit is directed upwardly. Another recycle stream 32 enters a heat exchanger 33 and is heated by steam entering through branch line 29B and leaving through line 29C. The heated recycle stream enters the lower portion of Stage I hydrolyzer 10 through a manifold 10B. The origins and significance of the recycle streams 30 and 32 are explained herein below.

Steam and/or condensate from the heat exchangers 31 and 33 leave the system through line 29D for further utilization as desired.

Undissolved biomass material subjected to first stage hydrolysis then enters tube 35. The tube 35 may be a continuation of hydrolyzer 10. A recycle stream in line 40 enters the tube 35 at two different points, one being through branch line 41 more remote from the bottom of hydrolyzer 10 and the other being through line 42 closer to the bottom of hydrolyzer 10. As indicated by the arrows the solid material, propelled if need be by suitable means such as a screw conveyor, moves to the right as viewed in FIG. 1. That portion of the recycle stream entering through line 42, proceeds predominantly upwardly through Stage I hydrolyzer 10 while that portion of the recycle stream entering through line 41 diverges, part flowing to the left, thence into hydrolyzer 10 and part flowing to the right with the solids to an in-line disintegrator 43 driven by a motor 44. The in-line disintegrator 43 may be any of various types such as a pair of mating notched plates one of which rotates while the other is stationary. The purpose of this disintegrator 43 is to disintegrate solids which are not dissolved in the first stage hydrolysis.

The in-line disintegrator serves to fragment the solid material, which has been weakened and pre-disposed to such mechanical comminution by the Stage I hydrolyzer. Thus a finely divided material presenting a large surface area proceeds through line 45 to a gas sparger unit 46 into which air or other gas containing molecular oxygen is introduced through line 47. The material then moves through line 48 to a slurry pump 49 driven by a motor 50 and proceeds thence by way of line 51 to the bottom of sensitizer unit 11. Slurry pump 49 brings about further intimate contact of air with the solids. Acid is introduced into sparger unit 46 through line 47a.

Within the sensitizer unit 11, additional agitation may be provided by a pump agitator 52 driven by a motor 53. At a higher level further agitation is provided by a turbine agitator 54 driven by a motor 55.

It will be understood that other means of agitation well known in the art may be employed in place of the pump agitator 52 and the turbine agitator 54, e.g., an agitator within sensitizer 11 driven by a sealed shaft extending into sensitizer. This agitation would augment that provided by the rising body of dispersed air in the sensitizer. Gas accumulates at the top of sensitizer 11 and is vented through line 66.

The sensitized biomass material then passes through line 58 to a heat exchanger 59 supplied with steam through the line 60. The cooled steam and/or condensate leaves the heat exchanger through line 60A. Heated biomass material in the form of a slurry passes by way of line 62 to an upper portion of Stage II hydrolyzer 12. At different levels lines 63 indicate the entry and exit of material from and to pumps or agitators (not shown) which serve to augment agitation and intimate contact between the solids and the liquid. Solid material together with the retained liquid pass by way of line 70 to a series of separators illustrated as being of the cyclone type but which may be of other types such as centrifuges or decanters. The slurry in line 70 may be cooled by suitable means (not shown) to minimize degradation of monosaccharides, such being done before the separating which will now be described.

The slurry from Stage II hydrolyzer 12 enters the top of cyclone separator 71. Separated liquid leaves through line 72 to a second similar cyclone separator 73. Separated liquid leaves separator 73 by recycle line 30 to heat exchanger 31. Thickened solids leave the lower portions of separators 71 and 73 through line 75 and are joined by the aqueous recycle (wash) stream in line 28. The joined streams pass into the first of two cyclone separators 78 and 79. Liquid separated by separator 78 passes by way of line 80 to the upper portion of separator 79. Liquid separated by separator 79 enters recycle line 32. Solids from separators 78 and 79 pass by way of line 82 to join a branch 28A of recycle line 28 and enter the first of two cyclone separators 85 and 86. Liquid from the upper portion of the first separator 85 leaves by way of line 87 and enters the second separator 86. Liquid separated by separator 86 enters recycle line 40 and passes through a heat exchanger 88 supplied with steam through line 60B. The heated recycle stream enters conduit 35 as described above. Cooled steam and/or condensate leaves through line 60C. Solids from the lower portions of separators 85 and 86 leave the system through line 90. The solids in this stream consist primarily of lignin if the biomass feed material is lignocellulosic. If the biomass material is cellulosic without lignin the solids consist of other difficultly hydrolyzable material. These solids may be subjected to wet oxidation as described in application Ser. No. 23,338 or they may be otherwise treated.

Figure 2:
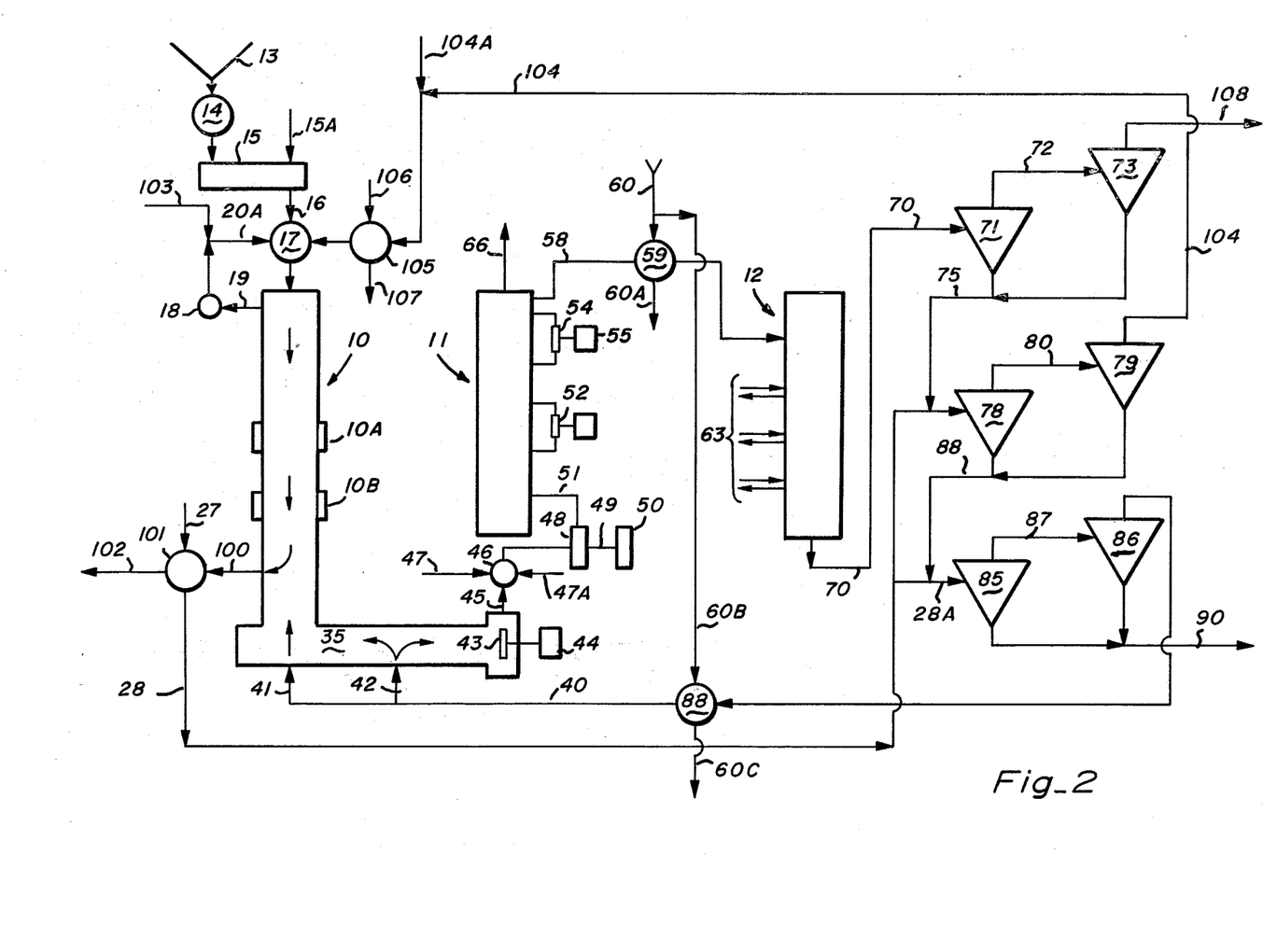
FIG. 2 is a flow diagram of another embodiment of the invention.

Referring now to FIG. 2 an alternative embodiment of the invention is illustrated. In this figure like reference numerals indicate lines and equipment which are identical to lines and equipment in FIG. 1.

The following changes are made as compared to FIG. 1. Hydrolysate is withdrawn from the bottom of first stage hydrolyzer 10 through line 100 and passes through heat exchanger 101 and leaves the system through line 102, e.g., for fermentation in the system of FIG. 4. An aqueous recycle stream 27 passes through heat exchanger 101 as in FIG. 1 except that heat exchanger 101 is placed differently in relation to hydrolyzer 10; i.e., heat exchange is between a recycle stream and hydrolysate from the bottom of the hydrolyzer. The recycle stream 19, 20A is retained but is not divided. The effluent liquid from separator 79 passes by way of line 104 to heat exchanger 105, thence to rotary valve 17. Acid is added through line 103 to recycle line 20A or through line 104a to line 104 or through both lines 103 and 104a. Heat exchanger 105 is supplied with steam through line 106 which leaves through line 107. The liquid effluent from separator 73 leaves the system through line 108. Where the feed material entering through line 16 is lignocellulosic the effluent in line 108 is predominantly an aqueous solution of glucose which may be further processed as described below in connection with FIG. 4.

Figure 3:
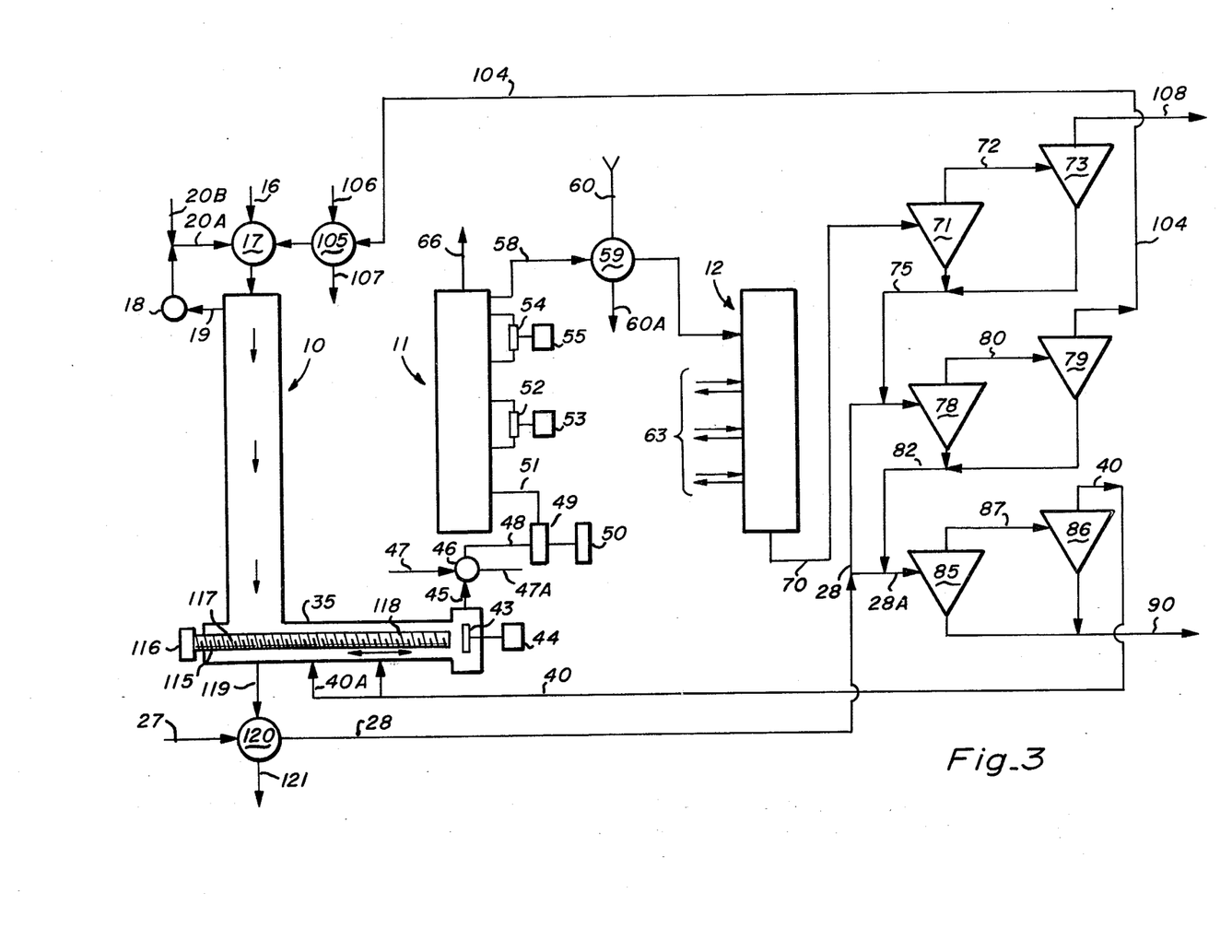
FIG. 3 is a flow diagram of a third embodiment of the invention.

Referring now to FIG. 3, reference numerals which are the same as in FIG. 1 indicate identical equipment and lines and reference numerals which are the same as in FIG. 2 indicate identical lines and equipment. Changes in FIG. 3 are as follows: Conduit 35 is provided with a screw conveyor or screw press comprising a shaft 115 driven by a motor 116 and which has helices 117 and 118. As indicated the pitch of the helix 118 is greater than the pitch of the helix 117, the purpose of which is as follows. Recycle line 40 recycles liquid which is dilute in sugars from separator 86 to the end of tube 35 remote from Stage I hydrolyzer 10, as in FIGS. 1 and 2 but a portion of this recycle stream is diverted and proceeds by line 40a to a point nearer the hydrolyzer 10. The smaller pitch at 117 causes a greater quantity of liquid to be expressed from the material and this expressed liquid leaves through line 119 as product. The thickened, higher solids material is then loosened up or rendered less dense by the greater pitch of helix 118, and liquid is added through line 40 sufficient to provide a mixture suitable for disintegration, etc. as described above. The expressed liquid in line 119 gives up heat in heat exchanger 120 to recycle liquid in line 27 which passes by line 28, etc. to the separator system as described above.

Figure 4:
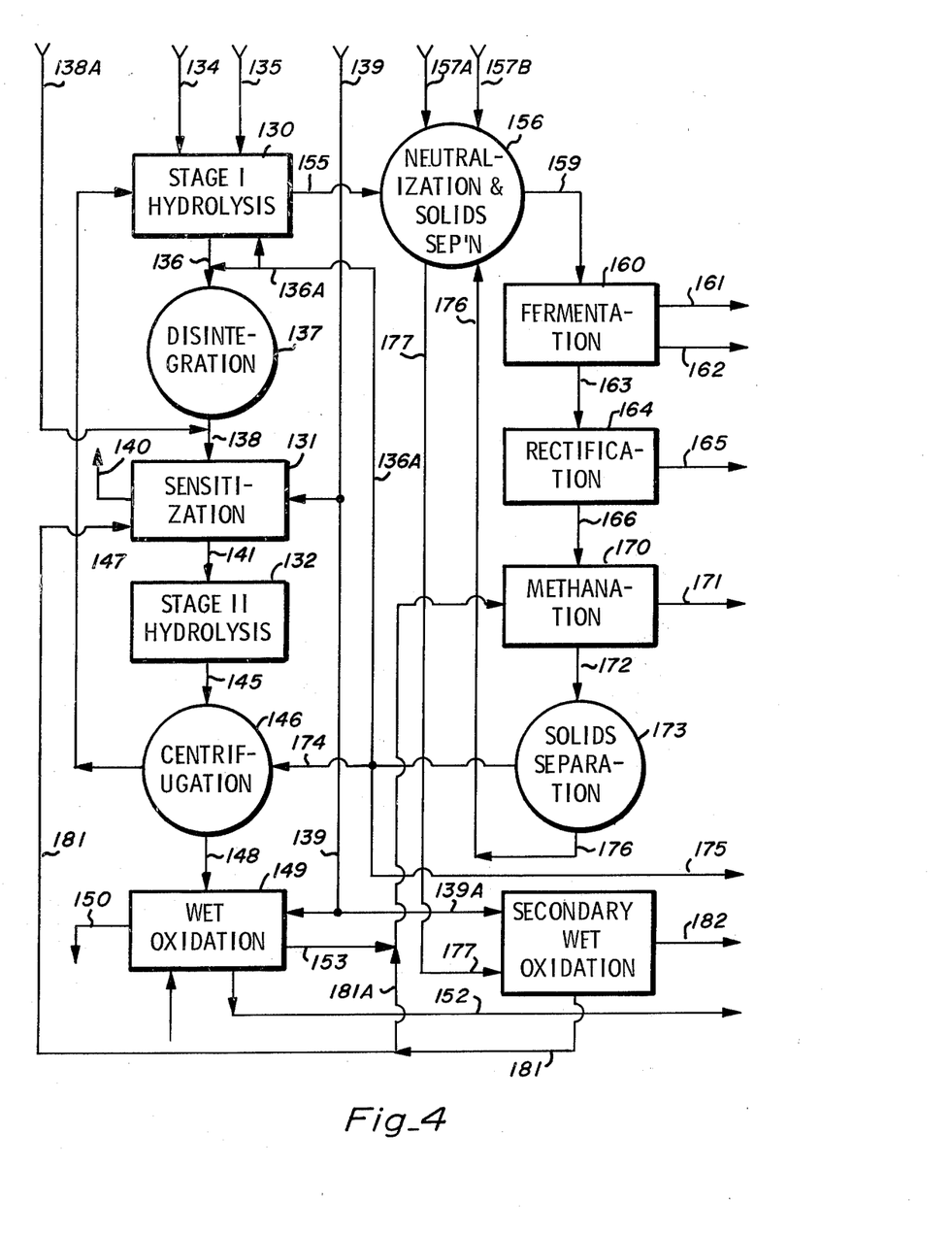
FIG. 4 is a flow diagram of a hydrolytic system such as that of FIGS. 1 to 4 in combination with a wet-oxidation-fermentation-methanation system.

Referring now to FIG. 4, there is shown an hydrolysiswet oxidation system together with a fermentation-rectification-methanation system such as described in Ser. No. 23,338, but with certain modifications as described hereinafter.

Referring to FIG. 4, a stage I hydrolysis unit 130, a sensitization unit 131 and a stage II hydrolysis unit 132 are shown. These may be similar or identical to the units 10, 11 and 12, respectively, of FIG. 1 and may be provided with auxiliary equipment for agitation, disintegration, sparging, etc., as in FIG. 1. Biomass material enters stage I hydrolysis unit 130 through line 134 and water or dilute hydrolysate to form a slurry is introduced through line 135. Effluent material, both solid and liquid, leaves stage I hydrolysis unit 130 through line 136 and enters a disintegrating unit 137 which serves to disintegrate the solid material which, as a result of stage I hydrolysis, is very susceptible to fragmentation and mechanical disintegration. Water as needed is supplied to stage I hydrolysis unit 130 and to the slurry flowing in line 136 through recycle line 136A. Effluent from the disintegrating unit 137 passes by way of line 138 to sensitization unit 131. Acid is introduced into sensitization unit 131 through lines 138A and 138. Oxygen enters this unit through line 139. Gases such as carbon dioxide and nitrogen are vented through line 140 and slurry passes by way of line 141 to stage II hydrolysis unit 132. From that unit the material passes by line 145 to a centrifugation unit 146 from which the separated liquid is recycled by way of line 147 to stage I hydrolysis unit 130. Solids pass by way of line 148 into a first wet oxidation unit 149, from which gases such as carbon dioxide and nitrogen are vented through line 150. Oxygen is introduced, preferably in the form of air, through line 139. Boiler water enters wet oxidation unit 149 through line 151 and steam indirectly produced by the heat generated from the exothermic oxidation reactions in unit 149 leaves through line 152 to be used in the process and/or for other purposes. Effluent slurry leaves through line 153 to methanation unit 170 (see below).

Returning to stage I hydrolyzer 130, hydrolysate leaves stage I hydrolysis unit 130 through line 155 and enters neutralization unit 156 to which a base such as calcium hydroxide and nutrients such as phosphate, ammonia, etc. are added through lines 157A and 157B, respectively. The base is added to neutralize acids so that fermentation can take place. Nutrients are added to promote fermentation. Solids resulting from neutralization of acid are removed through line 177 for further processing as described below.

The neutralized liquid hydrolysate leaves neutralizer 156 through line 159 and passes into fermentation unit 160. Products of this unit are carbon dioxide, which is separated through line 161, excess yeast which is separated through line 162 and beer which is separated through line 163 and is passed to rectification unit 164. Ethanol, for example, 95% ethanol, is removed through line 165. The residue leaves rectification unit 164 through line 166 and passes into methanation unit 170 wherein, by processes well known in the art, carbon dioxide and methane are produced which leave through line 171. See "Anaerobic Waste Treatment", Public Works, published in September, October, November and December, 1964 issues, pages 107–112, 123–126, 91–94 and 95–99, respectively. Liquid and undissolved solids leave methanation unit 170 through line 172 and pass into separation unit 173. Liquid separated in unit 173 provides recycle aqueous phase which leaves through line 174. Part of this liquid phase proceeds as described above through line 136A to stage I hydrolysis unit 130 and disintegrator 137. Another part passes into separator 146. Excess not needed for these purposes is removed from the system through line 175.

Solids together with retained liquid phase pass from separation unit 173 through to sterilization line 176 (not shown) and to neutralizer 156. These solids will include insoluble salts of calcium, principally calcium carbonate, which results from the action of methanation on soluble calcium salts in the methanation unit 170. The calcium carbonate thus introduced into neutralization unit 156 serves as the principal agent for neutralizing acids. The calcium hydroxide or calcium oxide added through line 157A is for make-up. The calcium hydroxide and/or oxide and the calcium carbonate function to neutralize acid in the hydrolysate. Insoluble calcium salts are precipitated and are separated together with other solids, for example such wood fines as may be present, and together with retained liquid, pass through line 177 to secondary wet oxidation unit 180 supplied with air through line 139A. In secondary wet oxidation unit 180 the solids are converted to soluble material which is passed through line 181 to sensitization unit 131. Alternatively, liquid from secondary wet oxidation unit 180 may pass through line 181A to methanation unit 170. Another alternative is to pass the solids and retained liquids from neutralization unit 156 directly to wet oxidation unit 149, thereby eliminating secondary wet oxidation unit 180. Factors which govern the choice of one of these alternatives are described below. Carbon dioxide is vented from wet oxidation unit 180 through line 182.

Figure 5A:
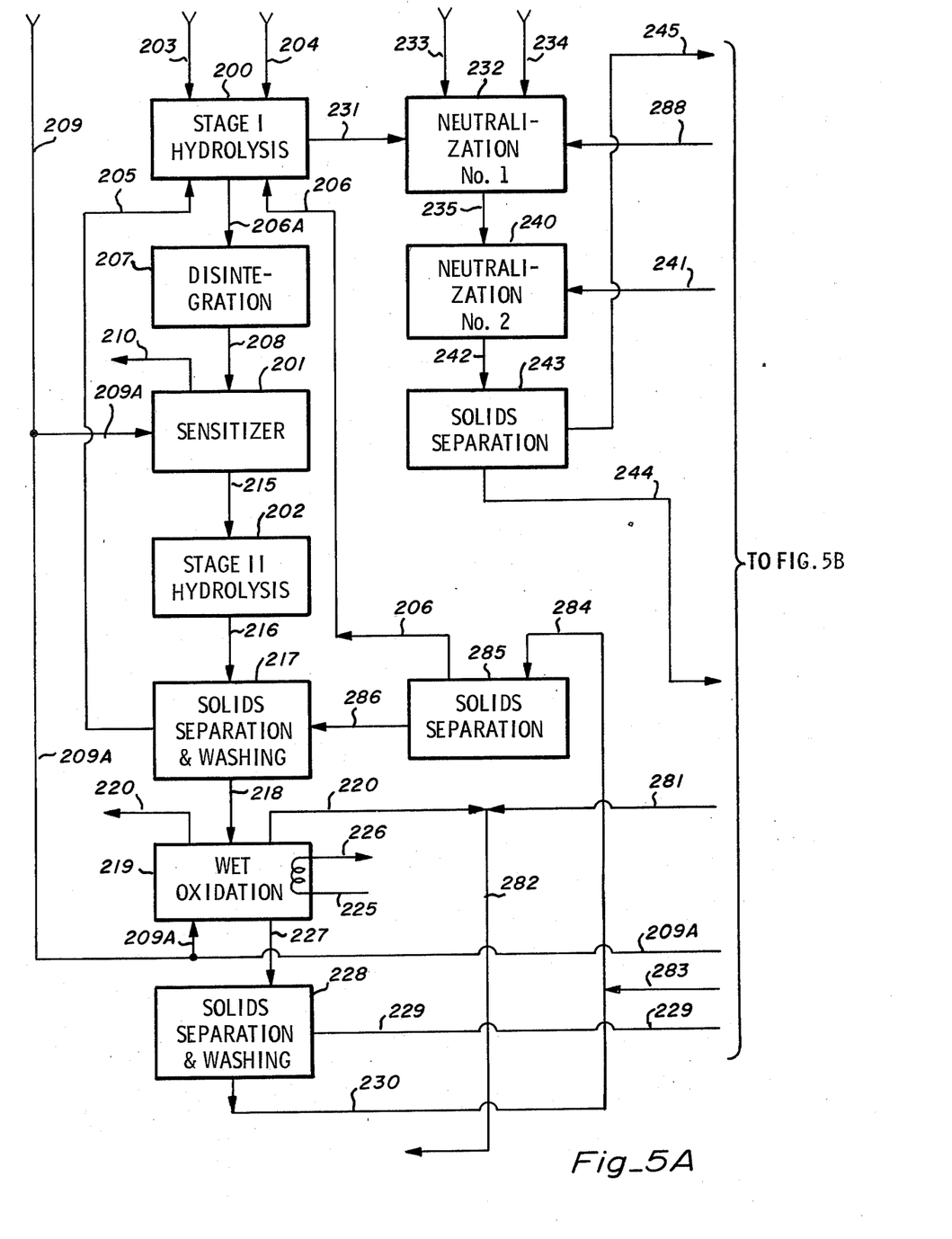
FIGS. 5A and 5B (the latter being a continuation of the former) are a flow diagram of another embodiment of the invention.
Figure 5B:
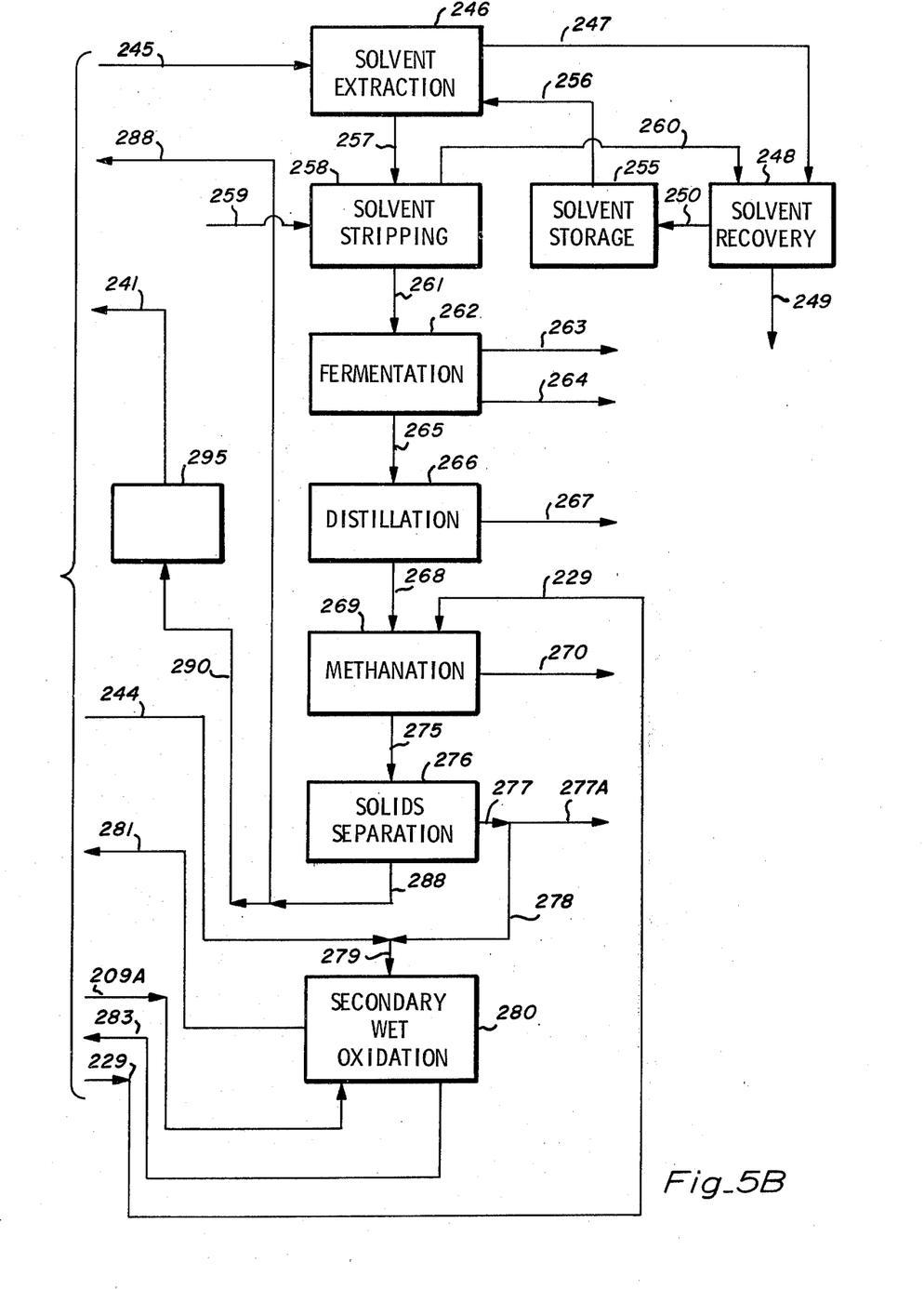

Referring now to FIGS. 5A and 5B a Stage I hydrolysis unit 200, a sensitization unit 201 and a Stage II hydrolysis unit 202 are shown. These may be similar or identical to the units 10, 11 and 12, respectively, of FIG. 1 and may be provided with auxiliary equipment for agitation, disintegration, refining, sparging, etc. as in FIG. 1. Biomass material enters Stage I hydrolysis unit 200 through line 203. Water, dilute acid or dilute hydrolysate, as needed, is introduced through line 204. Recycled hydrolysate is introduced through line 205. The water introduced with the biomass material and water introduced through lines 204, 205 and 206 provide a slurry. Effluent material, both solid and liquid, leaves Stage I hydrolysis unit 200 through line 206A and enters a disintegration unit 207 which serves to disintegrate the solid material which, as the result of Stage I hydrolysis, is very susceptible to fragmentation and mechanical disintegration. Effluent from the disintegration unit 207 passes by way of line 208 to sensitization unit 201. Oxygen, usually in the form of air, enters this unit through line 209. Gases such as carbon dioxide and nitrogen are vented through line 210 and slurry passes by way of line 215 to Stage II hydrolysis unit 202. From that unit the material passes by line 216 to a separation (e.g., centrifugation, decantation or filtration) unit 217. Separated liquid passes through line 205 to Stage I hydrolysis unit 200. Solids in the form of a slurry pass by way of line 218 into a first wet oxidation unit 219, from which gases such as carbon dioxide and nitrogen are vented through line 220. Oxygen is introduced, preferably in the form of air, through line 209A. Boiler water enters wet oxidation unit 219 through 225 and steam produced by the exothermic oxidation reactions in unit 219 leaves through 226 to be used in the process and/or for other purposes. Effluent slurry leaves through line 227 to solids separation zone 228. Aqueous phase leaves solids separation zone 228 through line 229 and separated wet solids leave through line 230. Line 229 goes to methanation unit 269 (see below).

Returning to Stage I hydrolyzer 200, hydrolysate leaves Stage I hydrolysis unit 200 through line 231 and enters neutralization unit 232 to which a make-up base such as calcium carbonate and make-up nutrients such as phosphate, ammonia, etc. are added through lines 233 and 234, respectively. The base may be calcium hydroxide, calcium oxide, magnesium carbonate, magnesium oxide or mixtures thereof. The base is added to neutralize acids and to adjust pH so that fermentation can take place. Nutrients are added to promote fermentation. The slurry leaves neutralizer 232 through line 235 to a secondary neutralization zone 240 where calcium oxide or calcium hydroxide is added through line 241 to complete neutralization and adjust pH to that required in fermentation. The slurry, after final pH adjustment, is passed through line 242 to a solids separation zone 243. The solids resulting from neutralization of acids are removed through line 244 for further processing as described below.

The neutralized liquid hydrolysate leaves solids separation zone 243 through line 245 and passes into solvent extraction unit 246 (see FIG. 5B). The solvent extract is sent by line 247 to solvent recovery unit 248. In solvent recovery unit 248 toxic and other extractable materials are isolated and recovered with an aqueous phase through line 249 as extract. The recovered solvent from recovery unit 248 is passed through line 250 to solvent storage unit 255. The solvent is sent through line 256, as needed, to the extraction unit 246. Raffinate from the extraction unit 246 is sent by line 257 to solvent stripping unit 258. Steam is supplied through line 259 to strip the solvent from the aqueous sugar solution and, together with vaporized solvent, is removed through line 260. The distillate in line 260 is introduced into solvent recovery unit 248. The sugar solution from solvent stripping unit 258 is sent by line 261 to the fermentation unit 262. Products of this unit are carbon dioxide, which is separated through line 263, excess yeast, which is separated through line 264, and beer which is separated through line 265, and is passed to rectification unit 266. Alternatively, fermentation and rectification may be carried out simultaneously according to Blanch and Wilke. Ethanol, for example, 95% ethanol, is removed through line 267. The residue leaves rectification unit 266 through line 268 and passes into methanation unit 269 wherein, by processes well known in the art, carbon dioxide and methane are produced which leave through line 270. See "Anaerobic Waste Treatment", Public Works, published in September, October, November and December, 1964 issues, pages 107-112, 123-126, 91-94 and 95-99, respectively. Liquid and undissolved solids leave methanation unit 269 through line 275 and pass into separation unit 276. Liquid separated in unit 276 leaves through line 277. The major portion of this liquid proceeds through line 278 and is combined with solid slurry in line 244 from solids separator 243 and proceeds through line 279 to the secondary wet oxidation unit 280. Water discarded from the system leaves through line 277A. Air is supplied to the secondary wet oxidation unit through line 209A. Gases from the secondary wet oxidation unit 280 are removed through line 281 and, together with gases in line 220, leave through line 282 and are utilized for heat and power generation. Alternatively the gases in line 281 and the gases in line 220 may be used separately for such purpose. The liquor and suspended solids from wet oxidation unit 280 pass through line 283 and are combined with a similar stream in line 230 from first stage wet oxidation described above. The combined streams pass through line 284 and are subjected to solids separation in unit 285. A part of the clarified aqueous stream proceeds through line 206 to wash and convey solids in and issuing from Stage 1 hydrolysis as described for line 27 in FIGS. 1 to 3 and line 136A in FIG. 4. The remaining aqueous phase, containing suspended solids, is conveyed through line 286, and serves as wash water in solids separation and washing unit 217 previously described.

A portion of the solids together with retained liquid phase pass from separation unit 276 through line 288 to neutralizer 232 wherein acids are neutralized with the evolution of carbon dioxide. The remaining slurry is conveyed through line 290 to lime kiln 295 where organic acids and other organic matter are combusted and calcium carbonate (or magnesium carbonate) is converted to calcium oxide (or magnesium oxide). The calcium or magnesium oxide is conveyed, as needed, through line 241 to neutralization unit 232.

The sequence of neutralization and then extraction may be reversed in order to isolate organic acidic material by introducing into line 231 an appropriate alcohol, in particular either ethanol or methanol (which are products of the process) or butanol (which is used in extraction). This will produce the corresponding esters of organic acids which are removed by distillation and condensation and constitute products of the process. Acids forming volatile esters such as acetic and formic acid esters are recovered by introducing partially water miscible alcohols such as n-butanol, isobutyl alcohol or pentanols. Some acidic materials as well as neutrals are extracted. The products are recovered through a cycle similar to that described above with reference to units 246, 248, 255 and 258.

This alternative procedure will result in a raffinate which contains fermentable sugars. This raffinate is then neutralized as in 232 and 240 and is subjected to solids separation as in 243 and the liquid is then subjected to fermentation and distillation as in 262 and 266. The solids separated from neutralized raffinate are then subjected to wet oxidation as in 280.

The stream in line 229 contains organic acids and these may be similarly treated with an alcohol to form the corresponding esters which in turn may be recovered by solvent extraction, etc. as described above. Therefore these products of value are recovered rather than carrying out their methanation in methanation unit 269. The raffinate resulting from such extraction is then subjected to methanation in unit 269.

GENERAL DISCUSSION

As noted above, various inorganic substances are added to the system to adjust pH (either to acidify or to neutralize) or to flocculate and to provide nutrients for fermentation. Certain of the inorganic substances, especially ferric iron or aluminum, also function to catalyze hydrolysis in Stage I and Stage II hydrolyzers 200 and 202 and wet oxidation in wet oxidation unit 219. These substances may be added at suitable points, for example, calcium carbonate may be added through line 233 and nutrients through line 234. Acid may be added, for example, through line 47A to the sparger 46. The acid may be any mineral acid, for example, sulfuric acid, hydrochloric acid, nitric acid, an acidic salt such as aluminum sulfate, ferric sulfate, aluminum nitrate or ferric nitrate. Nitric acid is preferred because it provides a nutrient for fermentation and because it is less corrosive to steel equipment than sulfuric and hydrochloric acids.

Referring to FIG. 1, the flow of liquid (recycled hydrolysate) in first stage hydrolyzer 10 is countercurrent to the flow of solids and is preferred where the solids are relatively coarse or dense such that they will sink notwithstanding countercurrent flow of liquid. (It will be understood, of course, that the downwardly moving solids carry liquid with them.) When the solids are of small particle size and/or of low packing or bulk density such that countercurrent flow is difficult or impractical, co-current flow may be used as in FIGS. 2 and 3.

As an alternative to the flow through second stage hydrolyzer 12 as shown in FIG. 1 and other figures, the slurry from sensitizer 11 may be caused to enter hydrolyzer 12 at the bottom and hydrolysate may be removed from the top. This has the advantage that the yield and concentration of sugars is increased. It is believed that this is due to the following:

Large particles of solids move downwardly faster in a downward flow and upwardly slower in an upward flow than the liquid phase and the finer particles. Therefore in the downward flow as shown in FIG. 1 the large particles will have a shorter residence time in hydrolyzer 12 and will be exposed to hydrolytic action a shorter time. If the slurry is introduced into the bottom of hydrolyzer 12 and is caused to move upwardly the larger particles will move upwardly more slowly. When a steady state is reached, and apart from the effect of hydrolysis on particle size, as many large particles will leave as enter the hydrolyzer 12, but each individual particle will have a longer residence time in hydrolyzer 12. Also differential velocities of liquid phase and large particles in this preferred embodiment are more efficient in extracting sugars from the large particles.

This preferred embodiment is also applicable to FIGS. 2, 3, 4 and 5A.

Referring to FIG. 5, appropriate flow of material (countercurrent or co-current) will be employed in first stage hydrolyzer 200 in accordance with the considerations described above.

In FIG. 1, it will be seen that concentrated hydrolysate recycled material (that is, hydrolysate which is most concentrated with respect to sugars) emanating from separator 73 is conducted through line 30 to a portion of Stage I hydrolyzer 10 nearer its inlet, while more dilute hydrolysate from separator 79 is recycled through line 32 to a point further down hydrolyzer 10. The least concentrated hydrolysate, that emanating from separator 86, passes through line 40 and is divided, part of it going into the bottom of hydrolyzer 10 and part of it acting to dilute the solids to put them in a more suitable form for disintegration by the disintegrator 43. This recirculation and recycling system improves efficiency in the use of the hydrolysates. Thus the most concentrated recycled hydrolysate is put through the first stage hydrolyzer at a point where it is subjected to a minimum of exposure to heat, which has a tendency to degrade the sugars. The product (other than lignin) of this system is a hydrolysate leaving through line 26 containing glucose and also pentoses, the latter being derived mainly from the hemicellulose content of the biomass material. The system described lends itself to maximizing the yield and concentration of these monosaccharides.

In FIG. 2, hydrolysate separated from the system through line 102 has a maximum concentration of sugar derived from hemicelluloses. Hydrolysate removed through line 108 has a maximum concentration of glucose derived from cellulose in second stage hydrolyzer 12. A less concentrated hydrolysate is recycled through line 104 to hydrolyzer 10. This minimizes mixture of glucose with pentoses so that two hydrolysates constitute end products of the system, one predominating in pentoses derived from hemicellulose, the other consisting largely of glucose derived from cellulose.

Part of the hydrolysate leaving hydrolyzer 10 through line 102 may be recycled to the top of the hydrolyzer and part of the hydrolysate leaving through line 108 may be recycled to the top of hydrolyzer 12. The purpose of such recycling would be to increase the concentration of sugars in the hydrolysate leaving the system but such recycling will expose the recycled sugars to degradation. An optimum balance between increased concentration and increased degradation will be employed.

Referring to FIG. 3, hydrolysates are withdrawn from the system through lines 121 and 108. As in FIG. 2, a relatively more concentrated hydrolysate (less concentrated than product withdrawn through line 108) is recycled from separator 79 through line 104 to the top of first stage hydrolyzer 10 and the most dilute hydrolysate leaves separator 86 through line 40 and is recycled to tube 35 and where it acts to wash solids relatively free of sugars, which leave through line 121. Another portion of this more dilute hydrolysate is employed to dilute the solids before they reach the disintegrator 43.

Referring to FIG. 5, the solvent extraction and recovery system at 246, 248, 255 and 258 serves to remove organic substances such as furfural, terpenoids, etc., which inhibit fermentation.

Ferric iron or aluminum salts added to this system, in addition to acting as catalysts also produce flocculent precipitates which aid in bringing down finely dispersed solids which are subjected to oxidation in the secondary wet oxidation unit 280.

Referring again to FIG. 1, as stated above acid, preferably nitric acid, is added through line 47a to the system at the sparger 46. This has the advantage of making the mixture more strongly acid after first stage hydrolysis has been accomplished and also at a time when the solids are in very finely divided form, such that the acid can act more readily upon them. The acid in diluted form is recycled through lines 30, 32 and 40 and act to maintain a suitable pH, for example, 2 to 3 in the first stage hydrolyzer 10. The liquor in line 30 may also be taken as a product with only the liquors in lines 32 and/or 40 being recycled.

Referring to FIG. 3, all or any portion of the hydrolysate in line 104 may be diverted to line 108.

As stated above in connection with FIG. 4 solids resulting from neutralization in unit 156 may be treated in several different ways. One way is to treat them in secondary wet oxidation unit 180 and introduce the liquid product into sensitizer 131. Another way is to introduce the liquid product of wet oxidation from secondary wet oxidation unit 180 into methanation unit 170. A third way is to eliminate secondary wet oxidation unit 180 and to introduce the solids and retained liquid from neutralization unit 156 into wet oxidation unit 149. Factors governing the choice of the method of treating the solids from neutralization unit 156 are as follows:

(1) If a flocculating acidic material such as ferric or aluminum nitrate, sulfate or acetate is added, for example, through line 138a, it will enter hydrolysis unit 130 through recycle line 147 and will pass through line 155 into neutralization unit 156 where metallic ions will be precipitated as the hydrous oxides which will serve to flocculate solids suspended in the liquid and to precipitate these solids which then leave through line 177 to secondary wet oxidation unit 180 where the organic material is oxidized to organic acids such as acetic acid. The metallic ions are redissolved as salts of such acids. The soluble salts are then introduced through line 181 into sensitization unit 131 and function there and in second stage hydrolysis unit 132 and wet oxidation unit 149 as catalysts for sensitization, hydrolysis and oxidation. Part of these soluble salts also enter first stage hydrolysis unit 130 through recycle line 147 and function as catalysts for hydrolysis and pass by way of line 155 to neutralization unit 156 to function again as flocculating agents.

(2) The alternative in which secondary wet oxidation unit 180 is eliminated would serve to simplify the system.

(3) If no iron or aluminum salt is added to the system the effluent liquid from secondary wet oxidation unit 180 may pass through lines 181 and 181A to line 153 to join effluent from wet oxidation unit 149 and the combined streams are introduced into methanation unit 170. This has the advantage that it avoids circulating calcium salts through the first stage hydrolysis-sensitization-second phase hydrolysis-wet oxidation part of the system.

If it is desired to produce organic acids as end products effluent liquid from wet oxidation unit 149 and/or 180 may be withdrawn from the system. The resulting solution of organic acids may be treated to isolate the organic acids and neutrals such as methanol and furfural and the residue may be subjected to methanation in unit 170.

The liquid effluent from secondary wet oxidation unit 180 will contain some solids. These solids may be removed in those alternatives in which the liquid effluent is sent to sensitization unit 131. The separated solids may be sent to methanation unit 170 or to wet oxidation unit 149.

As noted above, first stage hydrolysis of the biomass feed material predisposes the material to disintegration before it is subjected to sensitization and second stage hydrolysis. The feed material to first stage hydrolysis may vary considerably in size. For example, it may be in the form of wood chips of the type which provide the feed stock for a paper mill. Average particle sizes of about minus 1 to minus 20 mesh are suitable.

It will, therefore, be apparent that new and useful methods of treating biomass material have been provided which produce monosaccharides for fermentation, produce net energy, produce alcohol, combustible gases, organic acids, esters, etc.

I claim:

1. In the hydrolysis of biomass material in stages including a first stage hydrolysis in a first hydrolysis zone having an inlet and an outlet and under relatively mild hydrolytic conditions to hydrolyze primarily the more readily hydrolyzable polysaccharides and resulting in an aqueous solution of lower saccharides commingled with biomass solids, the latter comprising more difficulty polymerizable polysaccharide material, and then subjecting such biomass solids to a second, more severe hydrolytic treatment to depolymerize cellulose and such other difficultly depolymerizable polysaccharides as may be present, the improvement which comprises subjecting the product of second stage hydrolysis to phase separation resulting in separate streams of liquid separated from solids including first, second and third streams, the first stream being most concentrated, the second stream being less concentrated and the third stream being the least concentrated in soluble sugars.

2. The method of claim 1 wherein the first and second streams are introduced into the first hydrolysis zone, the first stream being introduced more remotely from the outlet and closer to the inlet of the first hydrolysis zone than the second stream, and causing the combined streams to flow through the first hydrolysis zone countercurrently to the biomass material.

3. The method of claim 1 wherein the first stream is withdrawn as product and the second stream is introduced into the first hydrolysis zone at or near its inlet and is caused to flow co-currently through the first hydrolysis zone with the biomass material.

4. The method of claim 1 or 2 wherein the third stream is used to wash solids leaving the first hydrolysis zone.

5. The method of claim 1 wherein effluent from the first hydrolysis zone is subjected to a dewatering step to express liquid which is withdrawn as product and to produce partially dewatered solids, and such third stream is divided into two parts one of which is used to add water to the partially dewatered solids, the other part being used to wash solids undergoing partial dewatering.

6. In the hydrolytic treatment of biomass material to produce a liquid hydrolysate containing one or more monosaccharides and wherein a first hydrolysis zone and a second hydrolysis zone are provided each having an inlet and an outlet spaced from one another and wherein the biomass material is introduced to the first hydrolysis zone through its inlet, is passed therethrough under hydrolytic conditions adapted to depolymerize principally only the more easily depolymerized polysaccharides, and wherein the resultant solid biomass material together with liquid aqueous phase is withdrawn through the outlet of the first zone and is caused to pass through the second hydrolysis zone from its inlet to its outlet and is subjected during such transit to more severe hydrolytic conditions to depolymerize cellulose and to produce an aqueous solution of glucose, and a mixture of the remaining solids together with a solution of one or more monosaccharides is withdrawn through the outlet of the second hydrolysis zone, the improvement which comprises:

(a) withdrawing from the outlet of the second hydrolysis zone a mixture of biomass solids and a solution of one or more monosaccharides and subjecting such mixture to a plurality of successive separation steps resulting in a plurality of streams of solutions substantially free of solids, each successive stream being less concentrated than the preceeding stream with respect to monosaccharides.

7. The improvement of claim 6 wherein at least one of the more concentrated streams is recycled to the first hydrolysis zone and one of the less concentrated streams is used to wash biomass solids effluent from the outlet of the first hydrolysis zone and also to dilute the washed solids.

* * * * *